United States Patent
Yamada et al.

(10) Patent No.: US 8,054,852 B2
(45) Date of Patent: Nov. 8, 2011

(54) WIRELESS COMMUNICATION TERMINAL AND WIRELESS COMMUNICATION METHOD

(75) Inventors: Akira Yamada, Yokohama (JP); Kei Igarashi, Yokosuka (JP); Takatoshi Sugiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 433 days.

(21) Appl. No.: 11/679,382

(22) Filed: Feb. 27, 2007

(65) Prior Publication Data

US 2007/0201505 A1 Aug. 30, 2007

(30) Foreign Application Priority Data

Feb. 28, 2006 (JP) ................................. 2006-053645

(51) Int. Cl.
 *H04L 12/413* (2006.01)
(52) U.S. Cl. .......................... 370/445; 370/336; 370/503
(58) Field of Classification Search .................. 370/338, 370/349, 432, 412, 445, 455, 503; 455/452, 455/574; 340/572.1; 463/1
See application file for complete search history.

(56) References Cited

U.S. PATENT DOCUMENTS

| | | | |
|---|---|---|---|
| 7,095,749 B1 * | 8/2006 | van der Tuijn | 370/412 |
| 7,245,946 B2 * | 7/2007 | Liu | 455/574 |
| 7,295,115 B2 * | 11/2007 | Aljadeff et al. | 340/572.1 |
| 7,403,511 B2 * | 7/2008 | Liang et al. | 370/338 |
| 7,502,381 B2 * | 3/2009 | Nakamura | 370/432 |
| 2002/0037729 A1 * | 3/2002 | Kitazawa et al. | 455/452 |
| 2003/0214928 A1 * | 11/2003 | Chuah | 370/336 |
| 2005/0009578 A1 * | 1/2005 | Liu | 455/574 |
| 2005/0233789 A1 * | 10/2005 | Maekawa | 463/1 |
| 2006/0056382 A1 * | 3/2006 | Yamada et al. | 370/349 |
| 2006/0062189 A1 * | 3/2006 | Takeuchi | 370/338 |
| 2006/0099956 A1 * | 5/2006 | Harada et al. | 455/452.2 |
| 2006/0245347 A1 * | 11/2006 | Jayaraman et al. | 370/208 |
| 2007/0127424 A1 * | 6/2007 | Kwon et al. | 370/338 |
| 2008/0056297 A1 * | 3/2008 | Gaur et al. | 370/447 |

FOREIGN PATENT DOCUMENTS

| | | |
|---|---|---|
| CN | 1684462 A | 10/2005 |
| EP | 1 587 242 A2 | 10/2005 |
| EP | 1 615 395 A1 | 1/2006 |
| JP | 2005-12725 | 1/2005 |
| JP | 2005-184522 | 7/2005 |
| JP | 2005-328515 | 11/2005 |
| JP | 2005-536117 | 11/2005 |
| WO | WO 2004/064284 A2 | 7/2004 |

OTHER PUBLICATIONS

"Amendment 8: Medium Access Control (MAC) Quality of Service Enhancements", Local and Metropolitan Area Networks, IEEE Std 802.11e, 2005, pp. 70-92. Stefan Mangold, et al., "IEEE 802.11e Wireless LAN for Quality of Service", Internet Citation, [Online], XP-002251598, Feb. 2002, 8 pages.
Office Action issued Jan. 25, 2011, in Japanese Patent Application No. 2006-053645 with English translation.

* cited by examiner

*Primary Examiner* — Aung S Moe
*Assistant Examiner* — Vincelas Louis
(74) *Attorney, Agent, or Firm* — Oblon, Spivak, McClelland, Maier & Neustadt, L.L.P.

(57) ABSTRACT

A communication terminal used in a mobile communication system complying with a carrier sense multiple access scheme is disclosed. The communication terminal includes: a receiving unit configured to receive a wireless packet transmitted by another communication terminal or a base station; a determination unit configured to determine periodic transmission timing of the communication terminal based on determination criterion information included in the wireless packet; and a transmission unit configured to periodically transmit wireless packets to the base station based on the transmission timing.

5 Claims, 4 Drawing Sheets

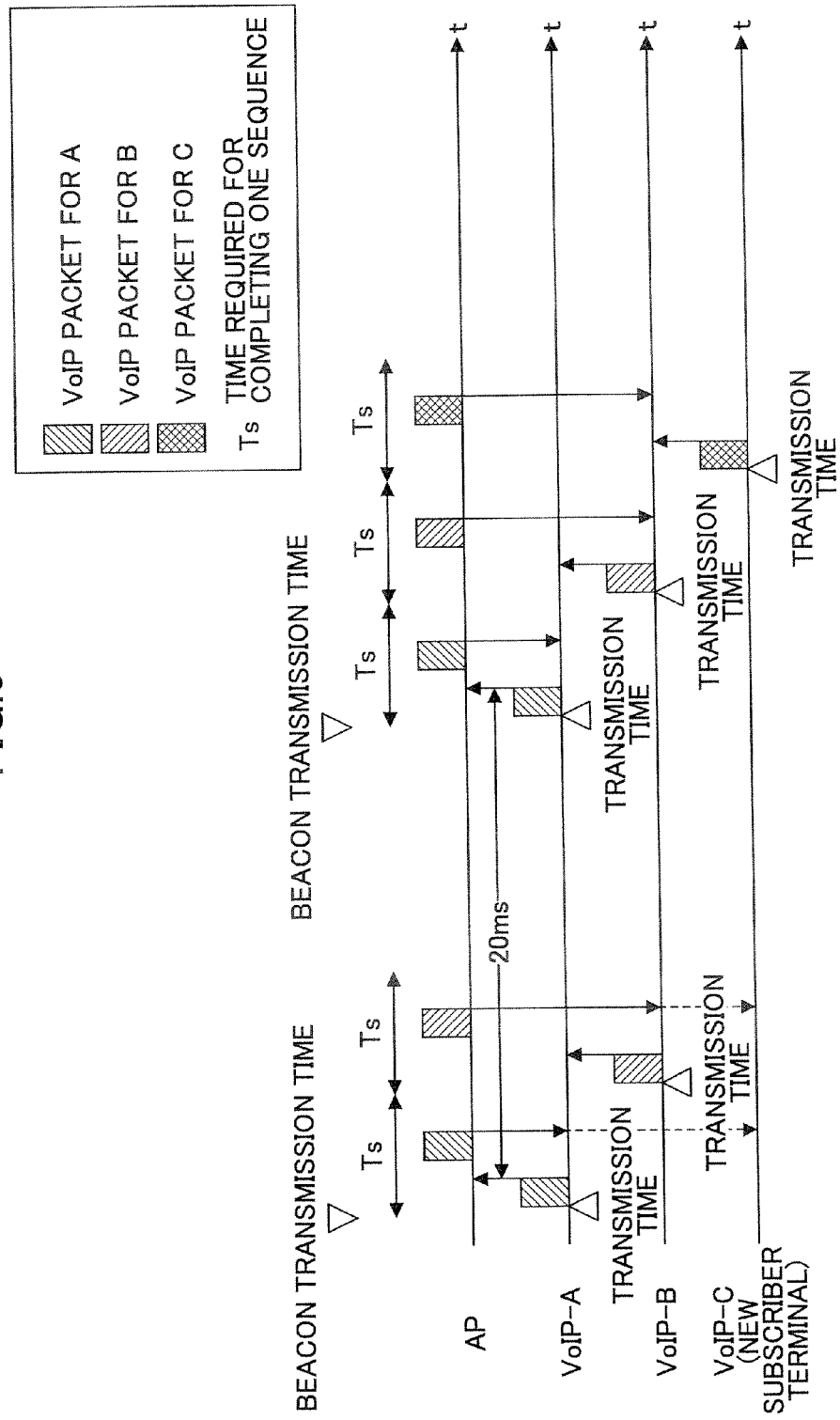

WIRELESS COMMUNICATION TERMINAL AND WIRELESS COMMUNICATION METHOD

BACKGROUND OF THE INVENTION

1. Field of the Invention

The present invention relates to a technical field of wireless communications. More particularly, the present invention relates to a wireless communication terminal and a wireless communication method in a mobile communication system conforming to a carrier sense multiple access (CSMA) scheme.

2. Description of the Related Art

In the CSMA scheme, a terminal performs virtual carrier sense before sending data so as to determine whether another terminal is communicating with a base station (also referred to as an access point). When the another terminal is communicating with the base station, the terminal transmits its wireless packet after the another terminal completes the communication. In principle, every terminal fairly has a right to transmit a packet. The virtual carrier sense is performed in the following way as a whole.

First, the terminal generates a random number within a predetermined CW (Contention Window) range after a channel remains in an idle state for a period called IFS (Inter Frame Space). Then, a random time period is determined based on the random number so that back-off control is performed within the random time period. The idle state indicates a state in which the wireless section is not used. In the back-off control, the random number is set to be an initial value, and the initial value is decreased as time passes, so that a wireless packet is actually transmitted when the number becomes 0.

The ISF is defined in the wireless local area network (LAN) standard IEEE802.11, and is a time period of an idle state that should be detected before packet transmission. The CW is a maximum value of the random number in the back-off control, and is a parameter necessary for realizing user multiplicity. In the IEEE802.11, a minimum CW value $CW_{min}$ and a maximum CW value $CW_{max}$ are defined. In back-off in a first transmission, the random number is generated using the $CW_{min}$, and each time when retransmission is performed, the value of the random number is increased to be doubled so that the back-off is performed. By the way, the $CW_{max}$ is an upper limit value of CW. By gradually increasing the value of CW, collision frequency and total traffic amount (including first transmission and retransmissions) can be decreased steadily. However, there is a possibility in that a plurality of terminals transmits wireless packets simultaneously in this scheme. When packet collision occurs, communication quality may be degraded and delay due to retransmission may continue for a long time.

Following documents are related to the technical field of the present invention.

[Patent Document 1] Japanese Laid-Open Patent Application No. 2005-12725

[Patent Document 2] Japanese Laid-Open Patent Application No. 2005-184522

[Non-Patent Document 1] ANSI/IEEE std 802.11, Wireless LAN medium access control(MAC) and physical layer (PHY) specifications, 1999

The non-patent document 1 discloses a technique to handle the problem by performing certain priority control. In this technique, EDCA (Enhanced Distributed Channel Access) that is defined in IEEE802.11e is used. Each packet is provided with a priority of four types of priorities, and each of IFS, $CW_{min}$ and $CW_{max}$ for a high priority packet is set to be short so that the high priority packet is transmitted preferentially. Accordingly, relative priority control can be performed in a communication environment in which various applications are mixed such as a voice communication application and a data communication application.

Also, as described in the non-patent document 1, in HCCA (HCF controlled channel access) defined in IEEE802.11e, a base station transmits a polling frame including channel use time period (TXOP: Transmission Opportunity) information to a communication terminal, and the communication terminal that receives the information obtains a preferential transmission right without the back-off.

The patent document 1 discloses a technique in which a base station reports a parameter related to transmission waiting time to each terminal according to a traffic amount in the whole of a cell, so that each terminal performs transmission according to the parameter. In this technique, it is intended to reduce possibility of collision of packets.

The patent document 2 discloses a technique in which transmission is allowed only at a transmission available time that is assigned within a predetermined time that repeats at a frequency. In this technique, it is intended that each terminal can perform communications smoothly.

However, in the conventional method such as the EDCA, merely a relative transmission priority order between packets having different priorities is determined, but guarantee of quality or contention avoidance is not performed between terminals that try to transmit packets having the same priority. Therefore, in a case where a plurality of terminals transmit packets having the same priority simultaneously, the possibility that collision of packets occurs cannot be reduced. When the collision of packets occurs, even if send and receive of the packet are successfully performed after the collision occurs by performing retransmission, a delay occurs due to the retransmission. In addition, if the retransmission also fails, discard of packet occurs so that there is a possibility in that unrecoverable signal quality deterioration may occur.

In a case where the back-off control is performed for obtaining packet transmission right by a plurality of terminals, a terminal from which transmission right is deprived of by another terminal needs to wait in order to obtain another transmission right so that delay increases. The more the number of terminals is, the higher an occurrence probability of the problem becomes. In a real-time application such as the VoIP (Voice over Internet Protocol), such delay and packet loss may cause especially critical quality deterioration.

On the other hand, in the HCCA, channel use time period is provided by sending the polling frame to each terminal so that signal quality guarantee may be provided. However, a concrete schedule designing method is not clearly defined, and also decrease of the transmission rate due to retransmission timing or link adaptation is not considered. In the application such as the VoIP in which it is necessary to periodically transmit a packet, when once collision of polling occurs collision may occur every time after that, so that the problem of signal quality degradation becomes serious. In addition, as to the HCCA, different from the EDCA, the HCCA requires that the terminal is provided with a specific chipset. Therefore, when adopting the HCCA scheme, it is necessary to provide a device supporting the HCCA in both of the terminal and the base station. Therefore, it is concerned that introduction of this method to an existing system is not easy.

In the technique disclosed in the patent document 1, although the base station dynamically changes the parameter on the transmission waiting time for each terminal according to the traffic amount of the whole of the cell, there remain above-mentioned concerns relating to contention of packets and quality deterioration since transmission timing is not provided to each terminal based on certain priority. In the patent document 2, each terminal may set transmission available time, but any concrete method is not disclosed. Especially, methods are not disclosed for the following cases: when retransmission is performed, when send/receive occupation period is changed due to transmission rate decrease, when there is a terminal that includes the function of the patent document 2 and another terminal that does not include the function of the patent document 2 (especially when packet contention occurs between the terminal that includes the function of the patent document 2 and another terminal that does not include the function of the patent document 2).

SUMMARY OF THE INVENTION

The present invention is contrived for solving at least one of the above-mentioned problems, and an object of the present invention is to provide a technique by which each communication terminal can autonomously determine a transmission time in a CSMA mobile communication system in which a plurality of communication terminals periodically transmit a wireless packet to an access point.

The object is achieved by a communication terminal used in a mobile communication system complying with a carrier sense multiple access scheme, the communication terminal including:

a receiving unit configured to receive a wireless packet transmitted by another communication terminal or a base station;

a determination unit configured to determine periodic transmission timing of the communication terminal based on determination criterion information included in the wireless packet; and a transmission unit configured to periodically transmit wireless packets to the base station based on the transmission timing.

According to the present invention, each communication terminal can autonomously determine a transmission time in a CSMA mobile communication system in which a plurality of communication terminals periodically transmit a wireless packet to an access point.

BRIEF DESCRIPTION OF THE DRAWINGS

Other objects, features and advantages of the present invention will become more apparent from the following detailed description when read in conjunction with the accompanying drawings, in which:

FIG. 5 is a timing chart representing an operation example according to an embodiment of the present invention.

DETAILED DESCRIPTION OF THE PREFERRED EMBODIMENTS

According to an embodiment of the present invention, each mobile terminal can autonomously determine a periodic packet transmission time without changing the base station. Accordingly, transmission timing for a plurality of communication terminals is determined easily and uniquely so that packet collision probability can be largely reduced. For realizing functions of the embodiment, it is only necessary to change the communication terminal side.

Also, according to an embodiment of the present invention, a destination address is extracted from a wireless packet sent from the base station to anther terminal, so that an address of the another terminal is compared with an address of the own terminal and the transmission timing is determined. For example, by using information specific to each terminal such as the MAC address, the transmission timing can be determined in each terminal easily and uniquely.

In addition, according to an embodiment of the present invention, information (station count number, for example), indicating a number of connecting terminals, included in a beacon from the base station is extracted, so that the transmission timing is determined such that the own terminal transmits a packet after terminals that are already connected transmit packets. Accordingly, the transmission timing can be easily determined.

In addition, according to an embodiment of the present invention, received signal quality reported to the base station by another terminal is compared with received signal quality of the own terminal, so that the transmission timing is determined. Accordingly, a communication terminal in a good channel state can obtain transmission right in priority to other terminals so that throughput in the whole of the system can be improved.

A re-synchronization request signal can be sent to the base station or another terminal when a packet error rate exceeds a predetermined value. Also, the determination unit may redetermine the periodic transmission timing based on a re-synchronization request signal received by another terminal.

Each of the determination methods for the transmission timing in various embodiments of the present invention may be used independently or a combination of the methods may be used.

First Embodiment

Figure 1:
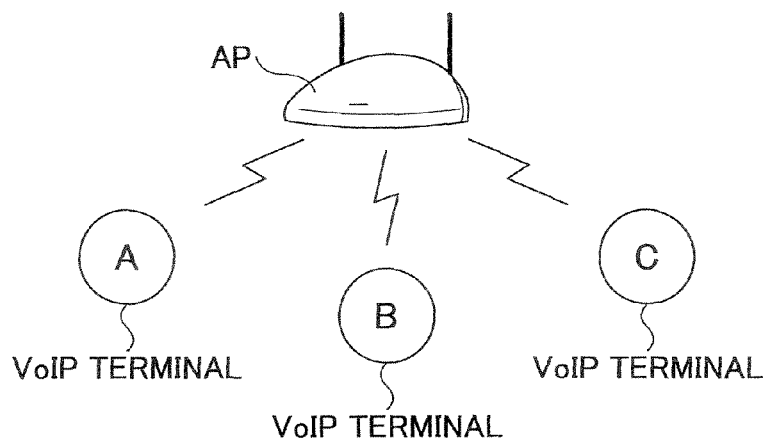
FIG. 1 shows a schematic view of a mobile communication system according to an embodiment of the present invention.

FIG. 1 shows a schematic view of a mobile communication system according to an embodiment of the present invention. As shown in FIG. 1, the mobile communication system includes an access point AP and a plurality of communication terminals A, B and C. The access point AP is a base station for wireless LAN, for example. The access point AP communicates with the communication terminals A, B and C by wireless and communicates with an upper apparatus (not shown in the figure) by cable or wireless.

The base station and the communication terminals form a wireless LAN. Each of the communication terminals can perform functions defined in IEEE802.11b for example, and includes functions described below according to the present invention. For the sake of convenience for explanation, each communication terminal sends and receives packets representing voice data (which can be referred to as realtime data more generally) using the VoIP, for example.

Different from non-realtime data, the realtime data is generated at predetermined time intervals and is transmitted sequentially. In this embodiment, the data transmission interval is 20 ms, for example. Generally, the data transmission interval may change according to service contents or setting rate or the like. But, in the following embodiments, it is assumed that each of the communication terminals A, B and C sends and receives data generated in the same generation cycle. Data to be transmitted may include contents for voice communication, TV phone, streaming and the like.

Figure 2:
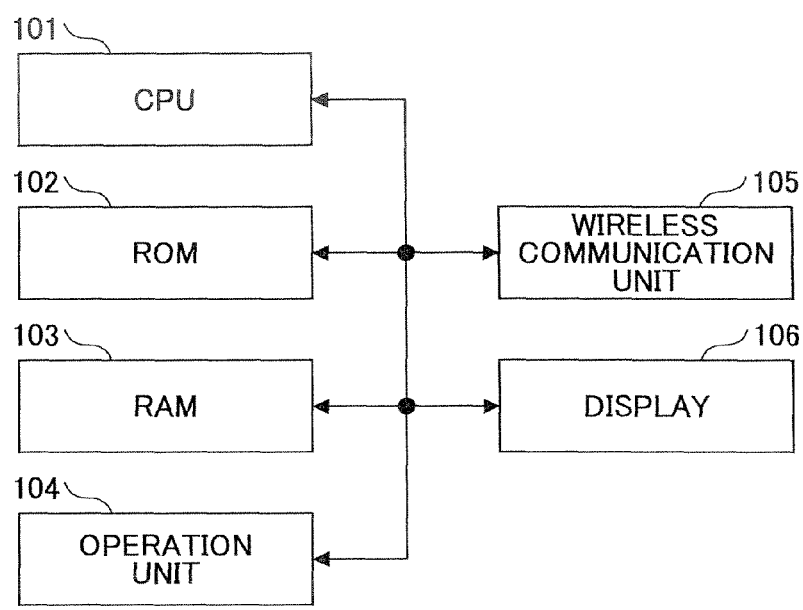
FIG. 2 is a block diagram of a communication terminal according to an embodiment of the present invention.

FIG. 2 is a block diagram of the communication terminal shown in FIG. 1. The communication terminal includes a central processing unit (CPU) 101, a read-only memory (ROM) 102, a random-access memory (RAM) 103, an operation unit 104 including a button and a switch, a wireless communication unit 105 that can perform CSMA communications, and a display 106. The example shown in the figure is merely an example of the communication terminal, and all of the components are not necessarily required. For example, when the present invention is applied to an embedded apparatus, the display is not necessary.

Figure 3:
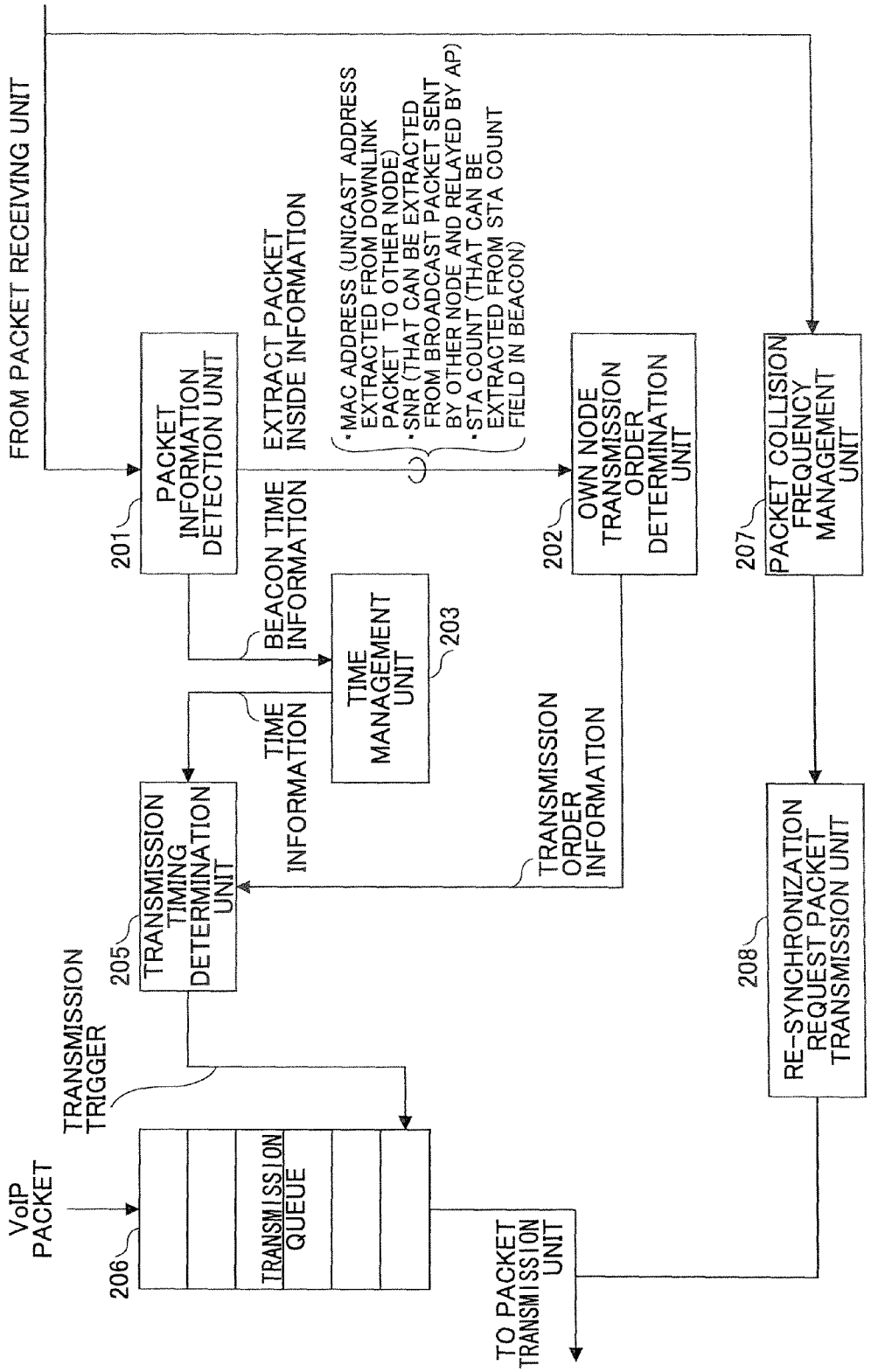
FIG. 3 is a functional block diagram of the communication terminal showing functions related to the present invention.

FIG. 3 shows functions of the communication terminal especially related to the present invention. These functions are realized by hardware components shown in FIG. 2. It is apparent for a person skilled in the art that the functions described below may be realized by hardware or software or a combination of them.

As shown in FIG. 3, the communication terminal includes a packet information detection unit 201, an own node transmission order determination unit 202, a time management unit 203, a transmission timing determination unit 205, a transmission queue 206, a packet collision frequency management unit 207 and a re-synchronization request packet transmission unit 208.

The packet information detection unit 201 extracts determination criterion information included in a received packet. The determination criterion information may be any information that can be used for determining after-mentioned transmission timing, and may include an address of another terminal, a number of terminals connected to a same base station, or a received signal quality measured in another terminal or the like. When the received packet is a beacon from the base station, the packet information detection unit 201 extracts not only the determination criterion information but also time information necessary for synchronization. The time information is passed to the time management unit 205.

The own node transmission order determination unit 202 determines transmission order based on the obtained determination criterion information, wherein the transmission order indicates timing on which the own terminal may transmit a packet, that is, indicates that the own terminal may transmit a packet after or before a particular terminal. Namely, order for transmitting a packet is determined among a plurality of communication terminals, and the order is output as transmission order information. How the order is determined is described later.

The time management unit 203 supplies time information to the transmission timing determination unit 205 based on time information obtained from the beacon. The time information includes information indicating that transmission should be performed after xx ms from a time when receiving the beacon, for example.

The transmission timing determination unit 205 determines timing by which the terminal periodically transmits packets in a transmission queue (transmission buffer) of the own terminal based on the transmission order information and the time information.

The transmission queue 206 outputs a packet based on a transmission trigger from the transmission timing determination unit 205. The output packet is transmitted via the wireless communication unit by wireless.

The packet collision frequency management unit 207 counts a number of events in which transmittal confirmation or acknowledgement (ACK) for a transmitted packet cannot be obtained. When the counted value exceeds a predetermined number, it is reported to the re-synchronization request packet transmission unit 208.

The re-synchronization request packet transmission unit 208 outputs a re-synchronization request packet in response to the report, so that the re-synchronization request packet is broadcasted to other neighboring terminals.

Figure 4:
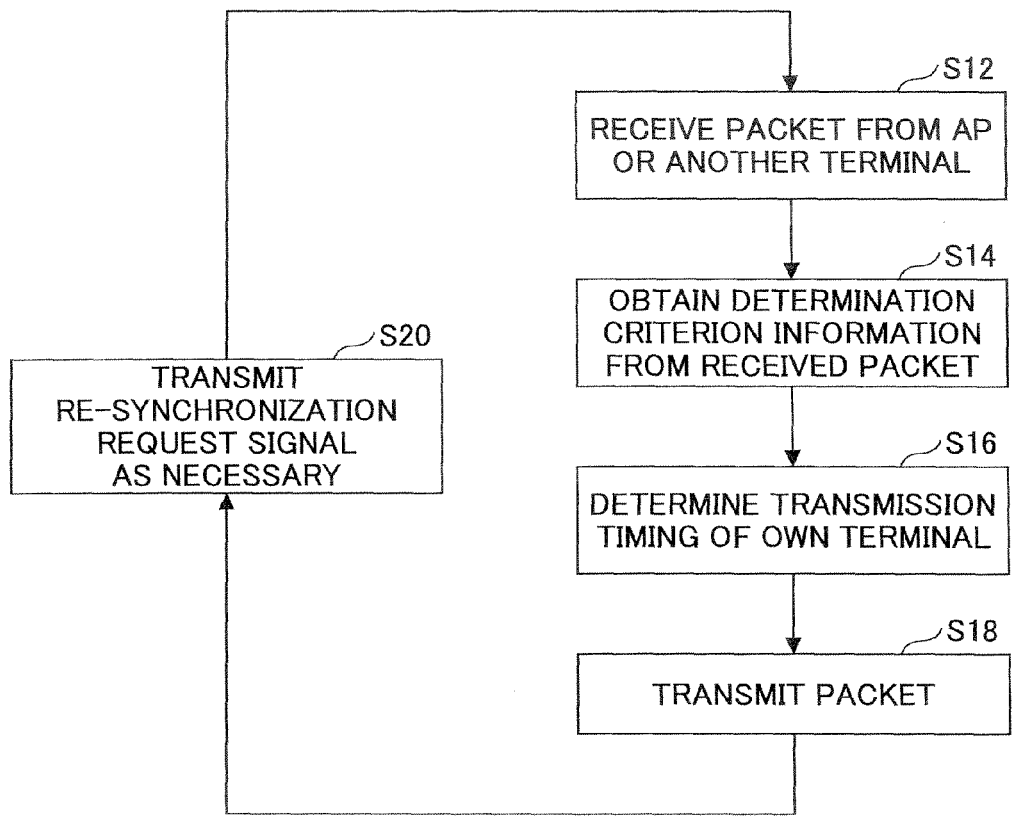
FIG. 4 shows a flowchart of a transmission timing determination method according to an embodiment of the present invention.

FIG. 4 shows a flowchart of a transmission timing determination method according to an embodiment of the present invention. For simplifying explanation, it is assumed that the communication terminals A and B have been communicating VoIP packets and that the communication terminal C that can send and receive VoIP packets tries to participate in the communication. In step S12, the communication terminal C receives packets transmitted by the base station and the communication terminals A and B.

In step S14, the communication terminal C obtains the determination criterion information from received packets. As an example, the determination criterion information obtained from a packet is a destination address included in the packet. In the present example, the determination criterion information are a destination address included in a packet transmitted by the base station to the communication terminal A, and a destination address included in a packet transmitted by the base station to the communication terminal B. That is, the communication terminal C receives a packet for the communication terminal A, and obtains address information (MAC address, more particularly) of the communication terminal A from the destination address of the packet. In the same way, the communication terminal C receives a packet for the communication terminal B, and obtains address information (MAC address) of the communication terminal B from the destination address of the packet.

As mentioned above, since the communication terminal C obtains address information of terminals other than the own terminal, the communication terminal C can know terminals that have been connected to the system in which the communication terminal C intends to participate.

In step S16, timing (transmission time) for transmitting a packet of the own terminal is determined based on the determination criterion information. In the present example, MAC addresses of the terminals A, B and C are prepared as the determination criterion information. The MAC address is also specific information of a communication terminal so that MAC addresses do not compete among different communication terminals. Therefore, for example, order of packet transmission among terminals can be determined based on sizes of the MAC addresses, for example. The order can be uniquely determined commonly for all terminals.

In this embodiment, order of communication terminals for packet transmission is determined in ascending order of the size of the MAC address. For example, assuming that the MAC address of the communication terminal A is "xx:xx:xx:00:00:01", the MAC address of the communication terminal B is "xx:xx:xx:00:00:03", and the MAC address of the communication terminal C is "xx:xx:xx:00:00:02". The communication terminal C checks sizes of the MAC addresses so as to ascertain that the communication terminal C can transmit a packet secondarily, that is, after the communication terminal A and before the communication terminal B. In this example, although the order is determined in ascending order of the size of the MAC addresses, the order may be determined in descending order or may be determined in other ways. In anyway, it is only necessary that the order is determined uniquely from a MAC address group.

In step S18, packets are transmitted periodically according to the determined packet transmission order. In the above example, the order of the communication terminal C is second.

After that, a re-synchronization request signal is transmitted in step S20 as necessary, and the procedure returns to step S12. The re-synchronization in step S20 is described later.

The similar procedure is performed in each of the communication terminals A and B. When the communication terminal C tries to participate in the mobile communication system, a certain packet of CSMA arrives at the base station from the communication terminal C before the procedure shown in FIG. 4 is performed in the communication terminal C. As is well known in this technical field, in the contention avoiding scheme in the CSMA, a contention avoiding protocol is performed each time when a packet is transmitted, so that periodic transmission timing described in FIG. 4 cannot be determined.

The packet transmitted from the communication terminal C to the base station without contention arrives also at the communication terminals A and B. Therefore, each of the communication terminals A and B performs steps S12 and S14 so that it can ascertain the MAC address of the communication terminal C. In step S16 for the communication terminal A, since the MAC address of the communication terminal A is less than the MAC address of the communication terminal C, the communication terminal A ascertains that it does not need to change transmission timing. In step S16 for the communication terminal B, since the MAC address (. . . :03) of the communication terminal B is greater than the MAC address (. . . :02) of the communication terminal C, the communication terminal B ascertains that it is necessary to delay transmission order. Accordingly, since each communication terminal ascertains MAC addresses of other communication terminals, the order common to every terminal is derived.

FIG. 5 is a timing chart representing the above-mentioned operation example on a time axis. As shown in the left side of the figure, each of the communication terminals A and B periodically sends and receives VoIP voice data generated at intervals of 20 ms, for example, with the base station AP. The base station performs packet communication with different communication terminals for each sequence (Ts) that is 1 ms, for example.

The communication terminal C newly participating in the communication observes downlink packets from the base station to the communication terminals A and B so as to determine transmission order as mentioned before. Each communication terminal determines transmission timing according to an order determined by itself so that each packet is transmitted according to the order as shown in the right side of the figure. The transmission timing of each terminal can be set with reference to timing of the beacon, for example.

Second Embodiment

Although the transmission order is determined by using the MAC address that is specific to each terminal in the first embodiment, the transmission order may be determined using other criteria (determination criterion information). For example, the base station transmits packets such as the beacon and a probe response and the like to each communication terminal belonging to the base station. In each of the packets, there is a field called a station (STA) count field which includes information of a number of communication terminals that are currently connecting. In the example of FIG. 5, before the communication terminal C participates in the system, the communication terminals A and B are connecting to the base station so that the STA count is two. By receiving the information from a beacon, the communication terminal C can ascertain that the STA count increases from two to three when the communication terminal C participates in the communication.

Therefore, for example, the communication terminal C transmits its packet after 2 (number of STA counts)×Ts (sequence period) elapses from the timing when receiving the beacon, so that packet transmission can be performed without collision with each other. Accordingly, it is preferable to use downlink notification information from the base station from the viewpoint of determining transmission order easily.

Third Embodiment

In addition to the above-mentioned examples, the transmission order may be determined using another criterion (determination criterion information). There is sometimes a case in which every communication terminal belonging to the base station needs to measure received signal quality of a downlink pilot channel and report it to the base station. The received signal quality may be measured as a SNR (Signal to Noise Ratio), a SIR (Signal to Interference Ratio) or other channel quality indicator (CQI). Each terminal periodically broadcasts a packet including the received signal quality so as to report it to the base station. Therefore, adjacent communication terminals may receive the broadcasted packet. By receiving and analyzing packets broadcasted by other terminals, received signal quality of other terminals can be ascertained.

The transmission order may be determined by comparing received signal quality of at least one other terminal and received signal quality of the own terminal such that a terminal having higher received signal quality can send packets in priority to other terminals having lower received signal quality. It is desirable that a communication terminal in a good channel state obtains transmission right in priority to other terminals from a viewpoint of improving throughput in the whole of the system.

Fourth Embodiment

When a plurality of packets transmitted from a plurality of communication terminals contend with each other, the packets are not properly received by the base station so that a PER (Packet Error Rate) may degrade and a packet delay for performing retransmission may become long. In each of the above-mentioned embodiments, it is intended that the transmission order of each terminal is properly determined such that contention does not occur as much as possible. However, in the second embodiment, when a plurality of communication terminals try to participate in the system simultaneously, there is a possibility that contention may occur.

For example, communication terminals C and D that try to participate in the system may simultaneously detect that the STA count is 2 so that each of the communication terminals C and D may transmit its packet at a time of 2×Ts after receiving a beacon. In addition, in the third embodiment, when received signal quality levels between own terminal and another terminal are the same, there is a possibility that superiority of the channel state, that is, the transmission priority cannot be clearly determined. However, the report of the received signal quality is merely performed periodically, and in addition to that, it can be predicted that the channel state may change every second.

In the fourth embodiment of the present invention, when the packet error rate is degraded due to reasons mentioned above for example, the communication terminal in the system is urged to perform re-synchronization.

More particularly, as shown in FIG. 3, the packet collision frequency management unit 207 in the communication terminal counts a number of times in which packet transmission is not acknowledged. The greater the number is, the worse the packet error rate is. When the number exceeds a predetermined number, it is reported to the re-synchronization request packet transmission unit 208. In response to the report, the re-synchronization request packet transmission unit 208 outputs a re-transmission request packet. Then, send and receive of the re-transmission request packet is performed while avoiding contention using the conventional CSMA/CA scheme so that every communication terminal ascertains necessity of re-synchronization. Then, each communication terminal performs steps after the step S12 in FIG. 4 to perform the procedure for re-synchronization again so as to check transmission order of the own terminal. In this case, transmission order derived by a communication terminal that requests re-synchronization may be included in the re-synchronization request packet.

The present invention is not limited to the specifically disclosed embodiments, and variations and modifications may be made without departing from the scope of the present invention.

The present application contains subject matter related to Japanese patent application No. 2006-053645, filed in the JPO on Feb. 28, 2006, the entire contents of which are incorporated herein by reference.

What is claimed is:

1. A communication terminal used in a mobile communication system complying with a carrier sense multiple access scheme and including a plurality of communication terminals that transmit wireless packets according to the same periodicity based on a respective different timing, the communication terminal comprising:
a receiving unit configured to receive a wireless packet transmitted by another communication terminal or a base station;
a determination unit configured to extract a destination address of the wireless packet that is sent from the base station to the another communication terminal, and compare a numerical value of the destination address of the another communication terminal with a numerical value of an address of the communication terminal so as to determine a transmission timing of the communication terminal based on an order of sizes of the numerical value of the destination address of the another communication terminal and the numerical value of the address of the communication terminal determined as the result of the comparison;
a transmission unit configured to periodically transmit wireless packets to the base station based on the transmission timing; and
a re-synchronization request transmission unit configured to transmit a re-synchronization signal to communication terminals when a packet error rate exceeds a predetermined value, wherein each communication terminal that receives the re-synchronization signal compares a numerical value of a destination address of a packet transmitted by another communication terminal with a numerical value of an address of the communication terminal that receives the re-synchronization signal so as to determine a transmission timing of the communication terminal that receives the re-synchronization signal based on an order of sizes of the numerical values as the result of the comparison, and wherein the determination unit re-determines the transmission timing when receiving a re-synchronization signal from another communication terminal.

2. The communication terminal as claimed in claim 1, wherein the numerical value of the destination address of the another communication terminal and the numerical value of the address of the communication terminal are each a MAC address value.

3. The communication terminal as claimed in claim 1, wherein the determination unit is configured to determine the transmission timing of the communication terminal to be before or after the another communication terminal based on the size of the numerical value of the destination address of the another communication terminal compared to the size of the numerical value of the address of the communication terminal.

4. The communication terminal as claimed in claim 1, wherein the another communication terminal participates in communication with a third communication terminal and has a transmission timing previously established with the third communication terminal, and the receiving unit receives the wireless packet transmitted by the another communication terminal or the base station and the determination unit determines the transmission timing of the communication terminal prior to the communication terminal participating in communication and establishing transmission timing with the another communication terminal and the third communication terminal.

5. A communication method used on a communication terminal in a mobile communication system complying with a carrier sense multiple access scheme and including a plurality of communication terminals that transmit wireless packets according to the same periodicity based on a respective different timing, the method comprising:
receiving, at the communication terminal, a wireless packet transmitted by another communication terminal or a base station;
extracting, at the communication terminal, a destination address of the wireless packet that is sent from the base station to the another communication terminal, and comparing a numerical value of the destination address of the another communication terminal with a numerical value of an address of the communication terminal so as to determine a transmission timing of the communication terminal based on an order of sizes of the numerical value of the destination address of the another communication terminal and the numerical value of the address of the communication terminal determined as the result of the comparison;
periodically transmitting, at the communication terminal, wireless packets to the base station based on the transmission timing;
transmitting, at the communication terminal, a re-synchronization signal to communication terminals when a packet error rate exceeds a predetermined value, wherein each communication terminal that receives the re-synchronization signal compares a numerical value of a destination address of a packet transmitted by another communication terminal with a numerical value of an address of the communication terminal that receives the re-synchronization signal so as to determine a transmission timing of the communication terminal that receives the re-synchronization signal based on an order of sizes of the numerical values as the result of the comparison; and
re-determining, at the communication terminal, the transmission timing when receiving a re-synchronization signal from another communication terminal.

* * * * *